(12) United States Patent
Romero

(10) Patent No.: US 8,793,883 B1
(45) Date of Patent: Aug. 5, 2014

(54) CLIPPER

(71) Applicant: Galliot, LLC, Oxnard, CA (US)

(72) Inventor: Ricardo Romero, Fillmore, CA (US)

(73) Assignee: Galliot, LLC, Oxnard, CA (US)

( * ) Notice: Subject to any disclaimer, the term of this patent is extended or adjusted under 35 U.S.C. 154(b) by 0 days.

(21) Appl. No.: 13/842,505

(22) Filed: Mar. 15, 2013

(51) Int. Cl.
  *B26B 13/14* (2006.01)
  *B26B 13/28* (2006.01)

(52) U.S. Cl.
  USPC ............... 30/261; 30/266; 30/267; 30/271; 30/298

(58) Field of Classification Search
  USPC ............................ 30/261, 266, 267, 271, 298
  See application file for complete search history.

(56) References Cited

U.S. PATENT DOCUMENTS

| | | | | |
|---|---|---|---|---|
| 397,389 | A * | 2/1889 | Richards | 403/161 |
| 536,086 | A * | 3/1895 | Krank | 7/131 |
| 671,231 | A * | 4/1901 | Poindexter | 7/114 |
| 672,050 | A * | 4/1901 | Williamson | 30/267 |
| 776,828 | A | 12/1904 | Earnhart | |
| 842,650 | A * | 1/1907 | Greenfield | 30/266 |
| 908,947 | A * | 1/1909 | Burkhart | 72/409.02 |
| 921,402 | A * | 5/1909 | Houck | 30/135 |
| 1,232,291 | A * | 7/1917 | Guerrero et al. | 30/145 |
| 2,032,281 | A * | 2/1936 | Haywood | 30/267 |
| 2,307,489 | A * | 1/1943 | Coats | 30/267 |
| 2,328,200 | A * | 8/1943 | Deakins | 30/298 |
| 2,392,118 | A * | 1/1946 | Cacarillo | 30/261 |
| 2,632,245 | A | 3/1953 | De Garmo | |
| 2,846,766 | A * | 8/1958 | Harter | 30/341 |
| 3,100,343 | A * | 8/1963 | Wessel | 30/232 |
| 3,170,237 | A * | 2/1965 | Weidauer | 30/268 |
| 3,371,416 | A | 3/1968 | Horton | |
| 4,203,208 | A * | 5/1980 | Tausendfreundt et al. | 30/155 |
| 5,461,784 | A * | 10/1995 | Baron | 30/135 |
| 5,463,814 | A * | 11/1995 | Stowell et al. | 30/232 |
| 5,628,116 | A * | 5/1997 | Kohno | 30/267 |
| 5,860,215 | A * | 1/1999 | Roskam et al. | 30/254 |
| 5,887,495 | A | 3/1999 | Kao | |
| 5,904,078 | A | 5/1999 | Gustafson et al. | |
| 6,282,995 | B1 * | 9/2001 | Lin | 81/423 |
| 6,336,272 | B1 * | 1/2002 | Lee | 30/262 |
| 2002/0023355 | A1 * | 2/2002 | Fujita | 30/254 |
| 2006/0021230 | A1 * | 2/2006 | Mikami | 30/194 |
| 2007/0124942 | A1 * | 6/2007 | Nenadich et al. | 30/266 |

OTHER PUBLICATIONS

E.P. De Garmo, R.J. Smith, & L.E. Davis, New Type Lemon Clipper, California Agriculture 6(6):7-7. DOI: 10.3733/ca.v006n06p7., Jun. 1952.
Lobo Orange Clipper, Lobo Products, Lobo Products, 2007.
Lobo Orange Clipper/ top view, Lobo Products, Lobo Products Inc, 2007.
Lemon Clipper, Barrilito, Lobo Products Inc, 2001.
Corona Avocado Clipper, Corona, Corona, 2005.

\* cited by examiner

*Primary Examiner* — Hwei C Payer
(74) *Attorney, Agent, or Firm* — Brooks Acordia IP Law, P.C.; Douglas N. Larson

(57) ABSTRACT

Clipper for lemons and other fruits. The clipper can have a pair of operating arms, a pivot assembly for the operating arms, a lower central open-position abutment mechanism, hand grips with adjustable and alternative left and right-hand strap mounting, and an out-of-the-way abutment arrangement to define a clipper open position. The pivot assembly can include a dust-free rotation structure and an out-of-the-way torsion spring. Gripping handles for clippers and the like are also disclosed.

30 Claims, 10 Drawing Sheets

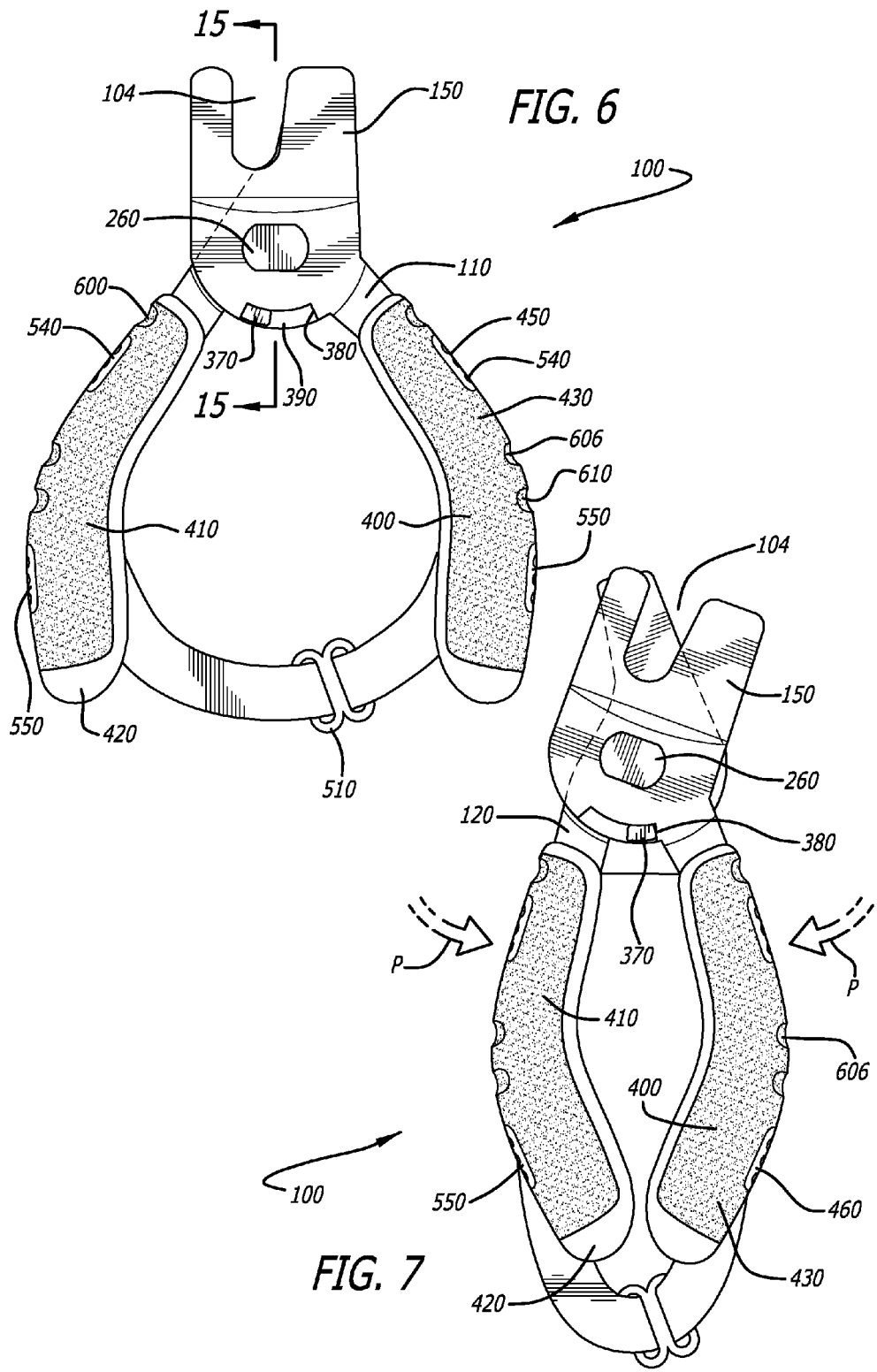

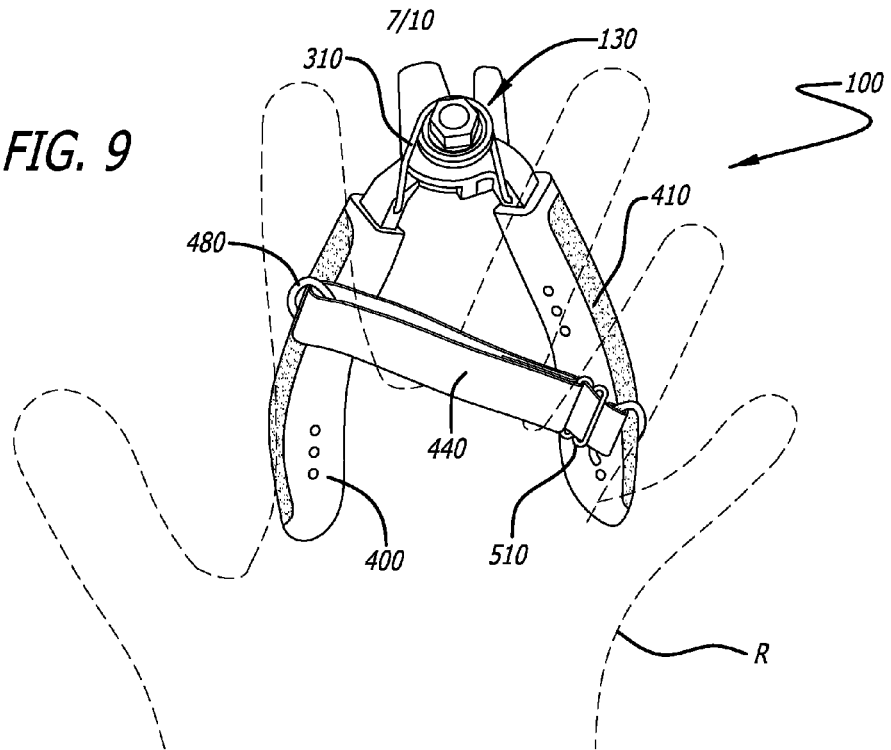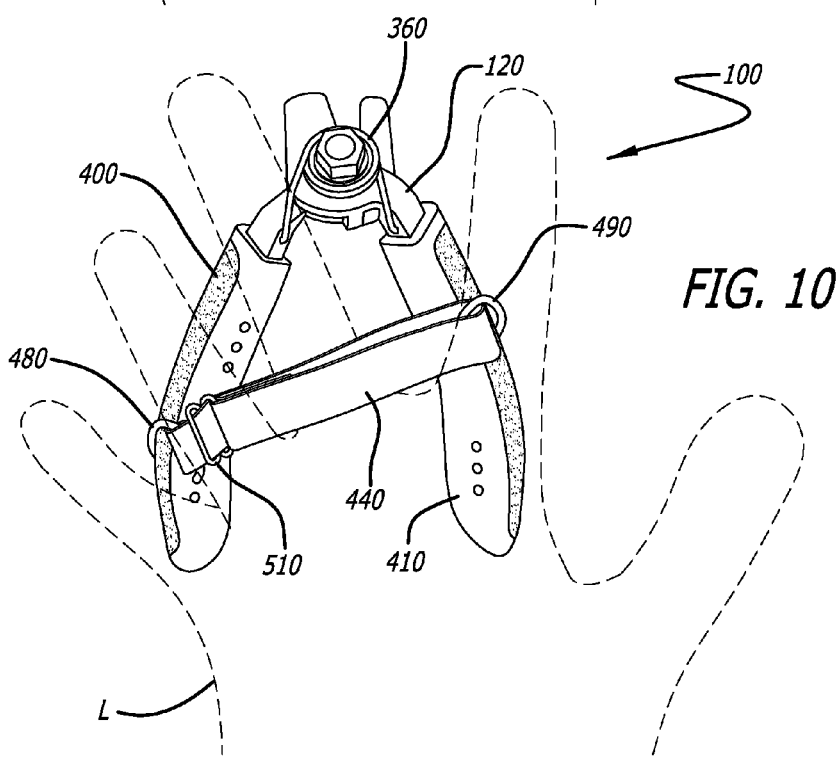

CLIPPER

BACKGROUND

The present disclosure relates to clippers and particularly clippers used to cut fruits from trees, fruits such as lemons, limes and oranges, as well as apples and avocados. Cutting fruit from trees requires a precise cut, adjacent to the stem button (for lemons). On the one hand, the cut (or cutting action) should not impact and thereby damage the rind or the button of the fruit; more specifically if the button is severed, the opening can cause the fruit (lemon) to spoil. On the other hand, the cut should cut the stem close to the fruit. If too much stem sticks out, the sharp points (often referred to as cut-buttons) can puncture an adjacent piece of fruit when the fruits are packed. And the stem may need to be cut a second time, closer to the fruit, which is an inefficient and labor intensive process.

SUMMARY

This section provides a general summary of the disclosure and one or more of its advantages, and is not a comprehensive disclosure of the full scope of all of the features, of all of the alternatives or embodiments or of all of the advantages.

Clippers for clipping fruits such as lemons and the like are disclosed. The clipper can include first and second operating arms connected together by a pivot connection assembly, which can be in the head portions of the arms. To prevent dust, sap and the like from entering the connection and thereby reducing its pivoting efficiency and/or requiring disassembling and cleaning, the pivot assembly can include a sealed roller bearing whose outer race has a tight fit with a head opening and whose inner race has a tight fit with a cylindrical portion of a screw (of the pivot connection assembly), and a washer which is held against the outer surface of the opening adjacent the roller bearing. The roller bearing can encircle a pivot axis of the pivot assembly.

A torsion spring of the pivot assembly can have opposite ends positioned in respective openings in interior lateral surfaces of the handle portions and the helical portion of the spring can encircle a nut of the pivot connection assembly. The head portions of the arms can include respective engagement surfaces, at least one of which is a cutting blade surface, and which move/slide relative to one another in a cutting action to cut a stem or the like positioned between them when the handle portions are squeezed towards one another. The torsion spring biases the handle portions and thereby the engagement surfaces to move to open positions when the squeezing pressure on the handle portions is released. An abutment member on one of the head portions can travel in a slot in the other between the handle portions, the slot defines by an abutment surface the outer extent of an open angle of the handle portions. The abutment member and the slot can be positioned out of the way in between upper end portions of the handle portions. The abutment surface at the opposite end of the slot can define the extent of a closed angle of the handle portions.

A connection mechanism on gripping handles at the operating arms can allow a hand strap to hold the gripping handles in the hand of the user to be positioned by the user in a plurality of alternative positions as selected by the user. These positions can accommodate left hand use, right hand use, different sizes of hands and/or different individualized fits.

The clipper can be a "guide/holding/receiving slot" type of clipper, such as is disclosed in U.S. Pat. No. 776,828 (Earnhart) and U.S. Pat. No. 3,371,416 (Horton). That is, the first head portion can be configured to form a guide/holding/receiving slot for receiving and containing the stem or other item to be cut. An edge of one finger of the first head portion can form an engagement surface of the clipper. Squeezing the handle portions causes the second handle portion to pivot towards the first handle portion, and thereby the blade (the cutting engagement surface) of the second head portion to slide across the finger of the first head portion, then through the object (e.g., stem) held (in two dimensions) in the slot, and to the blade edge of the second finger of the first head portion. The object (such as a lemon tree stem) is thereby cleanly cut with a shearing type action. Alternatively, it is within the scope herein to incorporate one or more of the disclosed features into a double-cut type of clipper, such as is disclosed in U.S. Pat. No. 2,632,245 (De Garmo), and as would be apparent to those skilled in the art from this disclosure. It further is within the scope to incorporate one or more of the features into by-pass type clippers, into clippers having concave cutting blades or into pruners (including bypass pruners).

According to one aspect of the disclosure a torsion spring can be used which has one angled end thereof in an opening in an upper interior surface of one handle portion and an opposite angled end thereof in an opening in an upper interior surface of the opposite handle portion. A coiled portion of the torsion spring can encircle the pivot axis (and more particularly the tightening nut of the pivot assembly) and can be adjacent the rearward surface of the head. The torsion spring thereby is advantageously positioned so as to not interfere with the cutting and handling processes. The torsion spring efficiently biases the handles and "blades" to open positions when the handle squeezing pressure is released. The torsion spring disclosed herein has an advantage over clippers having coil springs in that the coil springs typically must be frequently replaced such as every three weeks or so.

According to another aspect of the disclosure the pivot connection assembly can include a flat-head screw, a nut and a roller bearing. The pivot assembly allows the arms to pivot relative to one another when the handle portions are squeezed together, and particularly the second arm to be pivoted relative to the first arm, which can include a stem-receiving slot in its head portion. A washer can help keep the bearing and connection protectively sealed from dust, sap and the like. The non-circular head of the flathead screw can fit in a non-circular recess in the outer face of the first head portion. Thereby advantageously only a single tool, such as pliers, socket wrench or the like, is needed to adjust/remove the pivot assembly, since a screwdriver is not needed to prevent the screw head from turning. Rather, the screw head does not turn because the recess blocks turning due to the relative shapes, sizes and/or positions.

Further to the paragraph above, the roller bearing can have an outer race and an inner race, the outer race can be tightly held, such as by a friction fit, in the through-hole in one of the head portions and the inner race can be tightly held, such as by a friction fit, on the cylindrical portion of the screw such that when at least one of the first and second head portions pivots relative to the other the inner race rotates relative to the outer race.

According to a further aspect the head portions can include at lower edges thereof between upper end portions of the handle portions a pin and an abutment surface. Engagement of the pin against the abutment surface defines the fully open position of the handle portions and blade surfaces. Similarly, engagement of the pin against an opposing abutment surface defines a fully closed positioning of the arms.

According to a still further aspect of the disclosure gripping handles can be provided on the handle portions of the clipper. The gripping handles can each have a forward set of pairs of (oppositely-disposed) holes and a rearward set of pairs of (oppositely-disposed) holes. A length-adjustable strap can have rings at both ends thereof. The user can choose in which pair of holes in each set the user will attach the respective rings, allowing adjustable cross-over arrangements as desired. The strap allows the user to change the crossing angle of the strap relative to the handles between one angle to accommodate a user's right hand and an opposite angle to accommodate a user's left hand. Additionally, the right-handed and left-handed users can make small angle changes to achieve a desired fit according to a handle construction of the present disclosure. The users also can adjust the length of the strap, such as by using a conventional clip, to achieve a desired fit on their hands.

According to yet another aspect of the present disclosure a novel gripping handle for clippers or the like is provided. The gripping handle can include an elongate hollow sleeve having a curved central axis, an open end, an opposite closed end, and a hollow interior from the open end to the closed end. The sleeve can include an outwardly-extending first island and an outwardly-extending second island, spaced a distance longitudinally from the first island. The sleeve can further include a first hole extending through the first island and a second hole extending through the second island. A "coating" of a different elastomer on the sleeve can at least substantially encircle the first and second islands.

Further to the paragraph above, another aspect includes the first hole extending not only through the first island, but also the hollow interior and an opposite sleeve wall and engaging a bottom surface of the sleeve; and similarly the second hole can extend through the second island, the hollow interior and the opposite sleeve wall and engaging the bottom surface. Pursuant to yet another aspect, the coating can be made of a material that is softer than the material of the sleeve. A still further aspect is that one or more lateral indents or other gripping means can be provided (or formed) and by (or on) the coating adjacent and/or between the islands to provide for better gripping.

A gripping handle for clippers or the like is disclosed herein. The handle can include: an elongate sleeve which has an outwardly-extending first island and an outwardly-extending second island. The sleeve can include a first through-hole extending through the first island a second through-hole extending through the second island. A coating may be provided on the sleeve and at least substantially encircling the first and second islands.

The coating may be only on the top of the sleeve. It may be overmolded on the sleeve; that is, after the sleeve has been formed in a first mold and dried, the sleeve can be positioned in a second mold where the coating is overmolded onto it. The coating may be substantially flush with top surfaces of the first and second islands. The sleeve may be formed from an elastomer having a Shore A hardness on the order of 80-90 and the coating may be an elastomer having a Shore A hardness on the order of 40-60.

BRIEF DESCRIPTION OF THE DRAWINGS

The drawings described herein are for illustrative purposes only of selected aspects of the present teachings and not all possible implementations, and are not intended to limit the scope of the present teachings.

FIG. 6 is a top (front) plan view of the clipper in an open position.

FIG. 7 is a top plan view of the clipper in a closed position.

FIG. 9 is a rear perspective view of the clipper with the strap in a configuration to be held by a right hand of a user.

FIG. 10 is a view similar to that of FIG. 9, but with the strap in an alternative configuration to be held by a left hand of a user.

DETAILED DESCRIPTION

Figure 1:
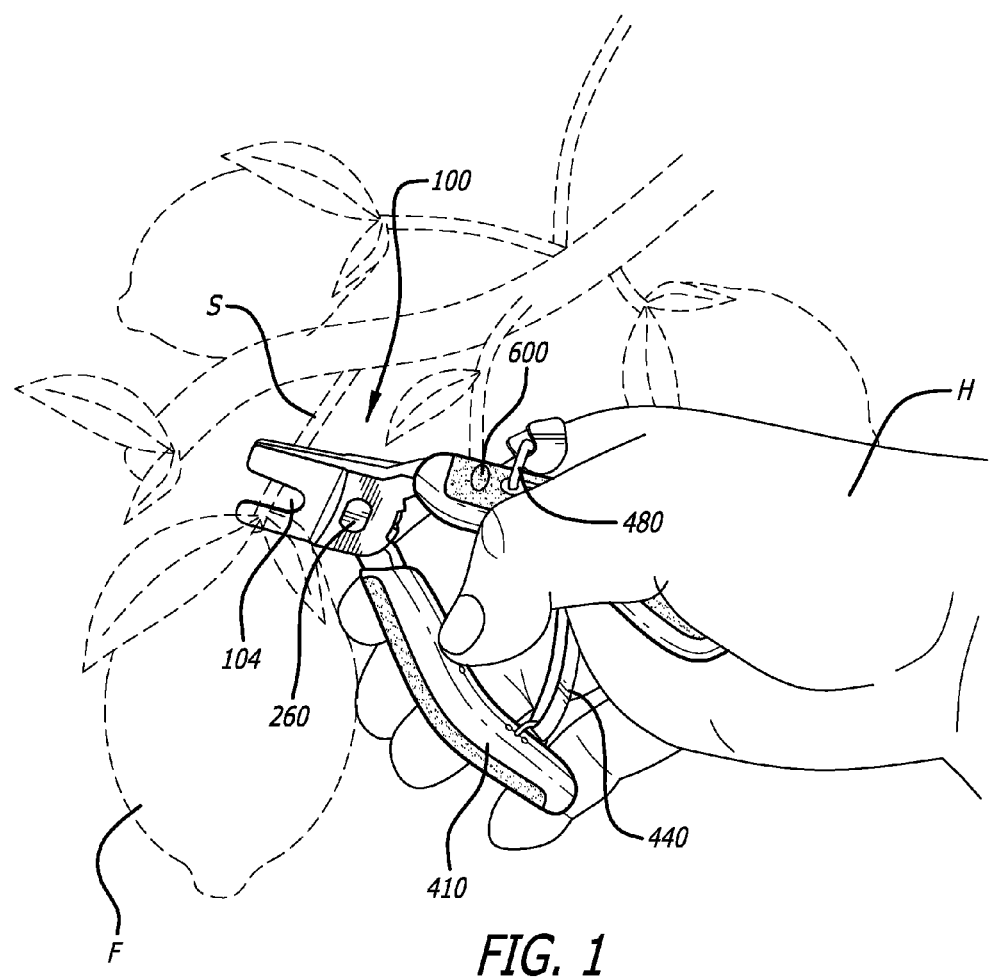
FIG. 1 is a top perspective view of a clipper of the present disclosure, illustrated being operatively held by a user and cutting fruit off of a stem.

Corresponding reference numerals indicate corresponding parts throughout the several views of the drawings.

FIG. 1 is a perspective view of a clipper of the present disclosure shown generally at 100 being operatively held in the hand H of a user and in a cutting position with a stem S positioned in the slot 104 of the clipper and with a forward face of the clipper adjacent the piece of fruit F.

Figure 2:
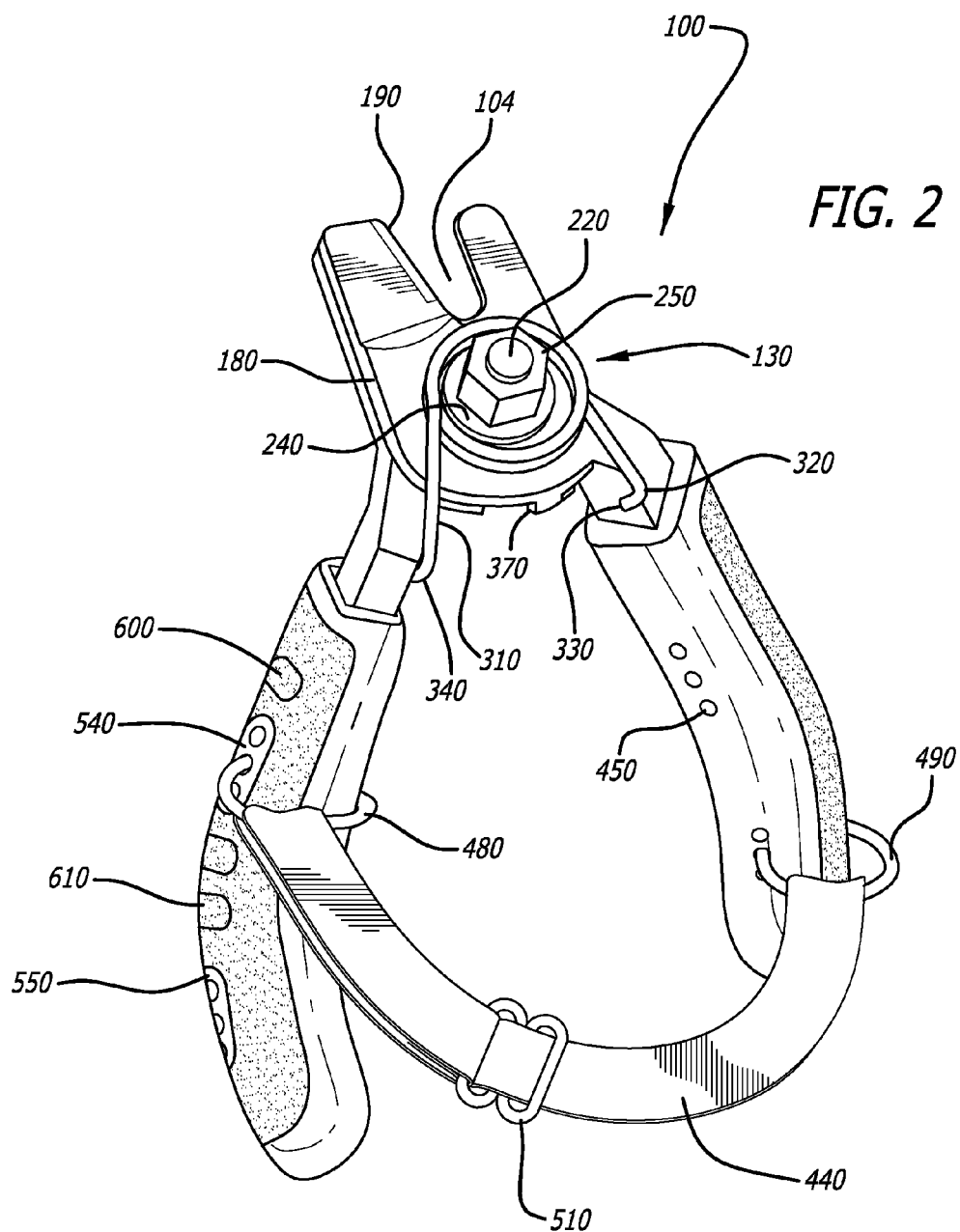
FIG. 2 is a bottom/rear perspective view of the clipper of FIG. 1.
Figure 3:
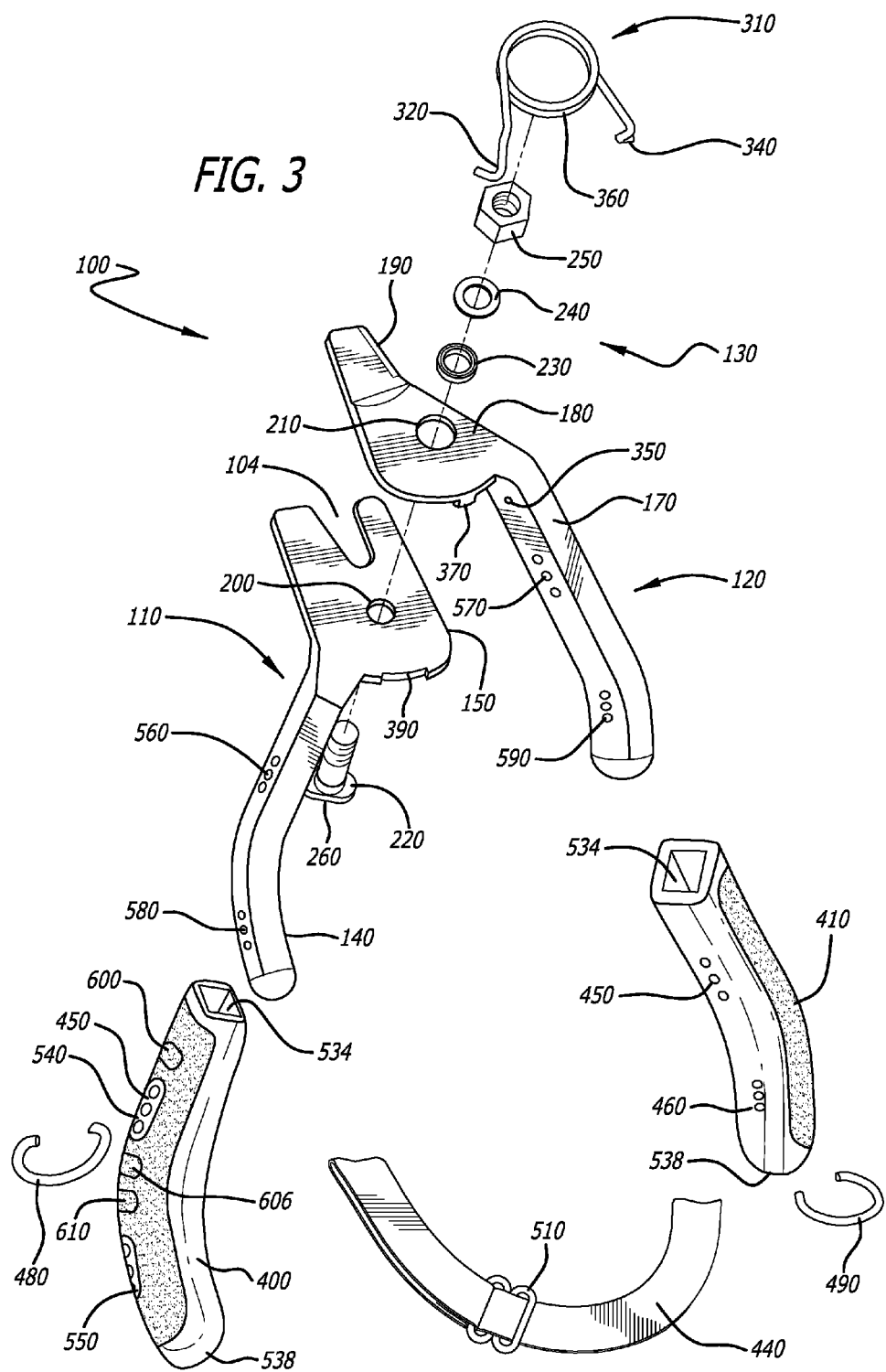
FIG. 3 is an exploded perspective view of the clipper.
Figure 17:
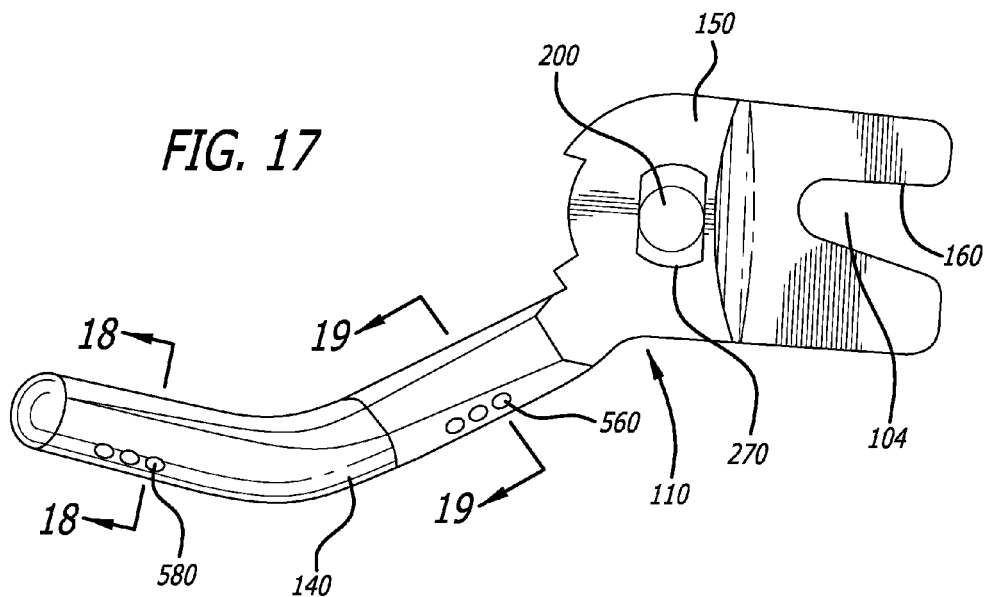
FIG. 17 is a plan view of one of the (first) operating arms of the clipper illustrated in isolation.

Further details of the construction and assembly of the clipper 100 are apparent from the other drawing figures including the perspective view of FIG. 2 and the exploded perspective view of FIG. 3. Referring thereto, clipper 100 can include first and second operating arms 110, 120 connected together by a pivot connection assembly 130 defining a pivot axis. The arms can be made of 17-4 heat-treated stainless steel. The first operating arm 110 can have a first handle portion 140 and a first head portion 150 with the first head portion including a first engagement surface 160 (FIG. 17). Engagement surface 160 can be a non-sharp concave surface and can protect the crown of the fruit so that the cutting surface does not harm the fruit. Similarly, the second operating arm 120 can have a second handle portion 170 and a second head portion 180 with the second cutting head portion including a second engagement (cutting) surface 190.

Figure 18:
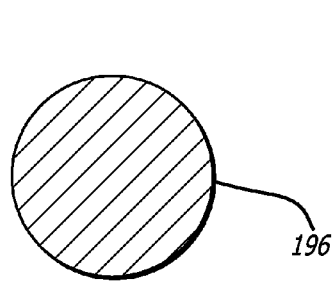
FIG. 18 is an enlarged cross-sectional view taken on line 18-18 of FIG. 17.
Figure 19:
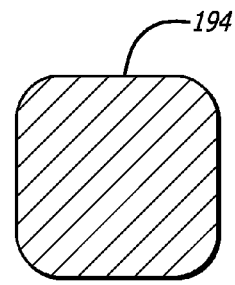
FIG. 19 is an enlarged cross-sectional view taken on line 19-19 of FIG. 17.

The handle portions can have curved shapes, as can be understood from FIGS. 3 and 17, for example. Additionally, their cross-sections can change gradually from a square/rectangular shape 194 (FIG. 19) to a circular shape 196 (FIG. 18). The round shapes 196 help the handle portions fit better in the user's hands and the gripping handles fit onto the end of the handle portions. In contrast, the square/rectangular shape 194 is similar to the connection to the head portion 150.

As depicted in FIG. 3 both of the head portions 150, 180 can include respective through-holes 200, 210, which when the clipper 100 is assembled, are aligned and the pivot connection assembly 130 is mounted therein. The pivot connection assembly 130 can include a screw 220, which fits through a roller bearing 230, a washer 240 and a nylon insert nut 250. The screw 220 can have a rectangular-shaped, flat head 260, which fits into a corresponding rectangular slot/recess 270 of a front face of the first head portion 150 so as to lie generally flat with the surface. This has the advantage of preventing the head of the screw 220 from getting in the way of the contact cut, thereby making for a cleaner and more accurate cut. It has a further advantage that only a single tool (pliers, socket wrench or the like) is required to remove the pivot connection assembly 130; that is, a screwdriver is not needed to prevent the screw 220 from turning in the recess 270 during removal.

The nylon insert nut 250 is threaded onto the threaded end 256 of the screw 220 until it abuts the washer 240 at the rearward face of the second cutting head portion 180 with a desired pressure fit. Thus, only a single tool is needed to tighten or loosen the nut 250 because the flat-head 260 of the screw is held in place by the rectangular slot 270, which prevents rotational movement of the screw head fitted therein, and not by a slotted head screw requiring a screwdriver. Additionally, the flat-head 260 does not wear down as countersunk slotted head screws can do resulting in a loose fit and preventing adjustment. Thereby, maintenance, cleaning and sharpening of the clipper 100 as may be needed are quick and easy.

Figure 16:
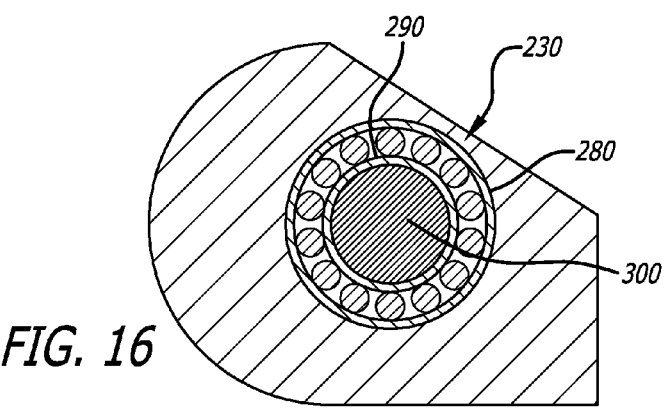
FIG. 16 is a sectional view taken on line 16-16 of FIG. 15, and showing the roller bearing in greater detail.
Figure 20:
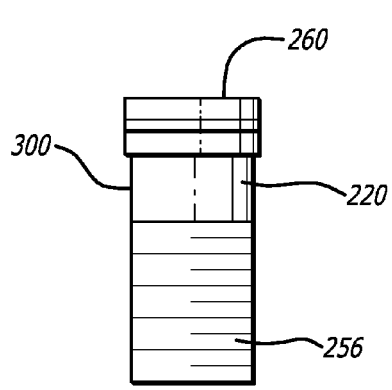
FIG. 20 is an enlarged elevational view of the screw of FIG. 3 illustrated in isolation.
Figure 21:
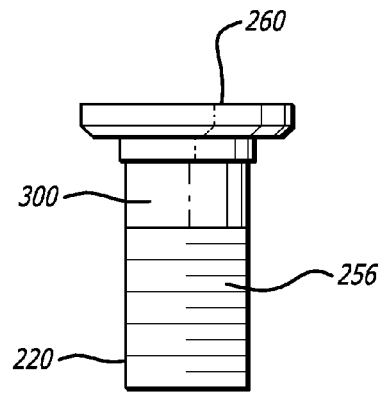
FIG. 21 is another elevational view of the screw taken ninety degrees from the view of FIG. 20.

The roller bearing 230 can be disposed generally between the first and second head portions 150, 170 and provide a friction-resistant pivoting surface for the head portions to pivot relative to one other. The outer race 280 can be friction-held in the hole 210 in the second head portion 170 and the inner race 290 (FIG. 16) can be friction-held onto the cylindrical portion 300 of the screw 220 (see FIGS. 20 and 21, for example) between the threaded end 256 and the flat-head 260. When one of the races jams the other continues to spin.

An example of a roller bearing 230 that can be used is the 7 mm×11 mm×3 mm WML7011ZZX, SMB Bearingball deep groove ball bearing, made of stainless steel with each bearing having two metal shields to protect the bearing from dust and other contaminations, and the bearings being pre-lubricated with grease. The roller bearing 230 can be a sealed construction that protects the bearings from dust, sap, moisture and other intrusions, such that it does not become clogged preventing or inhibiting pivoting. Thereby its working life is prolonged and the need for labor-intensive disassembly, cleaning and reassembly is eliminated/reduced.

Figure 4:
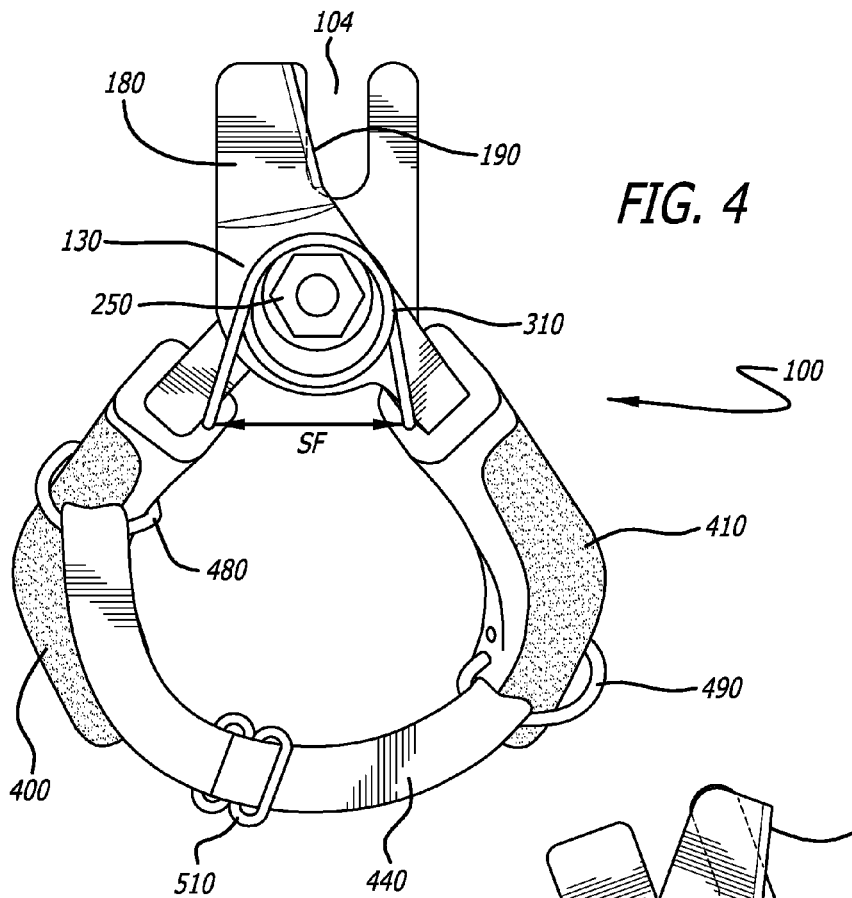
FIG. 4 is a bottom (rear) plan view of the clipper in an open position.
Figure 5:
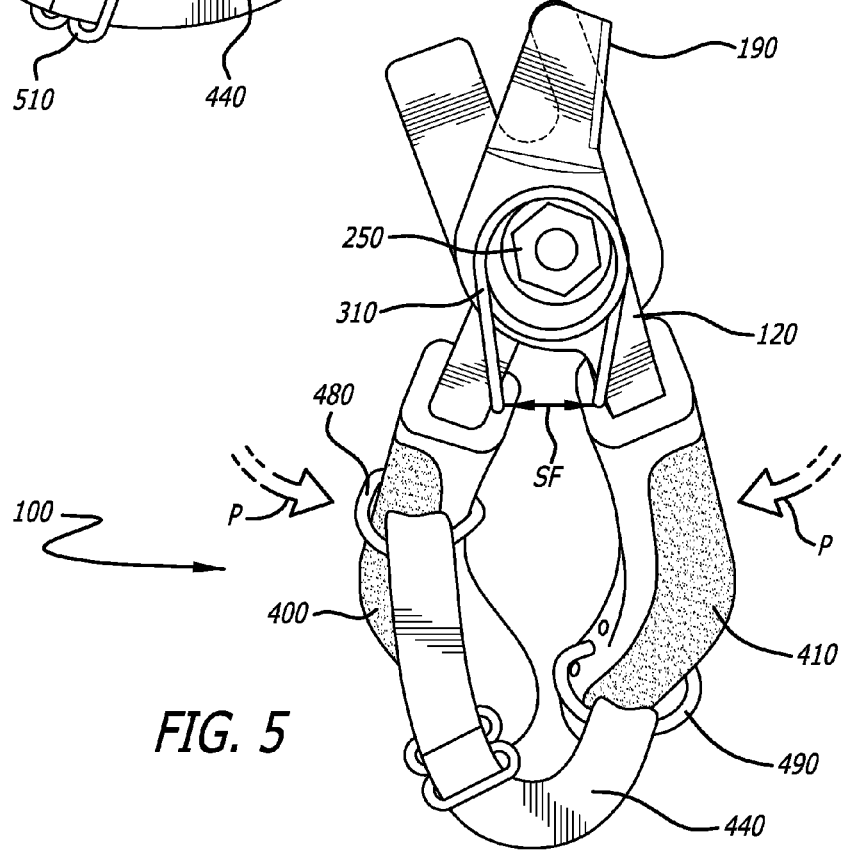
FIG. 5 is a bottom plan view of the clipper in a closed position.

Referring again to FIGS. 2 and 3 for example, the clipper 100 (or the connection assembly 130) can include a torsion spring 310 to bias the cutting surfaces and the handle portions to respective open positions. The torsion spring, which is sometimes referred to as a scissor spring, can have a spring rate of 0.13 LBF-IN/DEG. The torsion spring 310 can have a first angled end 320 positioned in a first opening 330 in a top lateral interior surface of the first handle portion 140, and a second angled end 340 positioned in a second opening 350 in a top lateral interior surface in the second handle portion 170. A helical portion 360 of the torsion spring 310 between the first and second ends 320, 340 can encircle the nut 250 and thereby a pivot axis of the pivot assembly 130 and biases the surfaces 160, 190 towards the open position as shown by spring force SF (FIGS. 4 and 5). In other words, the torsion spring 310 biases the clipper 100 from the closed positions, as shown in FIGS. 5 and 7, to the open positions, as shown in FIGS. 4 and 6, when the user's gripping pressure P on the handle portions 140, 170 is released. The unique (protected) position of the torsion spring 310 on a clipper 100 of the present disclosure at the back face of the head portion reduces the likelihood that the spring will get caught on tree branches, the user's clothing and the like during use, thereby reducing the chances that it will get lost or be damaged, requiring replacement.

The torsion spring 310 can be a "heavy duty" torsion spring; that is, it can have a longer durability than springs currently used on conventional clippers. For example, it can be made of stainless steel #302, have a cache caliber of 0.062, and a spring rate of 0.13 LBF-IN/DEG.

The fully open position of the clipper 100 can be defined by engagement of the abutment member or pin 370 with the abutment surface 380. When squeezing pressure P on the handle portions 140, 170 is released and the torsion spring 310 biases the clipper 100 to the open position by spring force SF the abutment member 370 can travel in an arcuate slot or recessed area 390 until it reaches and engages the abutment surface 380, which can be an end of the slot.

This movement can be understood by comparing FIG. 7 with FIG. 6. Referring to FIG. 3, the abutment member 370 can be formed in the second head portion 180 and the slot 390 and abutment surface 380 in the first head portion 150. And both the slot 390 and the abutment member 370 can be positioned on lower edges/surfaces of the respective head portions and between the first and second handle portions 140, 170. The abutment surface 380 and the pin 370 are thereby positioned out of the way and are less likely to catch on branches, leaves or the user's gloves or other article of clothing. More specifically and referring to FIGS. 2, 6 and 7 for example, the forward face of the clipper 100 has the retention slot 390, an end of which serves as a limiting abutment 380 for the pin 370 so that the blade 190 does not go beyond its limit. Further, this unique positioning of the semi-circular or arcuate slot 390 on the forward, central lower edge prevents the clipper 100 from pinching the fingers (e.g., index finger) of the user.

A first gripping handle 400 can be positioned on the first handle portion 140 and a corresponding second gripping handle 410 can be positioned on the second handle portion 170. Both may be force fit onto their respective handle portions. The handles 400, 410 can be formed of an 80 Shore A polyurethane elastomer substrate 420 with a 60 Shore A polyurethane elastomer overmold 430, with an "islands" construction that will be described in detail later. The sticky soft rubber overmold 430 allows the handles to adhere to the user's palm and thereby avoid slippage.

The handle portions with gripping handles thereon can have unique curvatures in three dimensions which as can be understood from the drawings, better fit into the hand of the user, than prior lemon clippers by closely conforming to the shape and curves of the palm of the user's hand.

An adjustable strap 440 can be attached to the handles to reliably hold the clipper 100 in the user's hand, as depicted in FIGS. 1, 9 and 10. Details of how the strap 440 can be attached to the gripping handles 400, 410 are illustrated in FIG. 2, for example. Referring thereto, each of the gripping handles 400, 410 can include a first series of pairs of holes 450 at a forward location and a second series of pairs of holes 460 at a rearward location, spaced a distance rearwardly of the first location.

Each pair can have a hole on an inward (bottom) surface and a corresponding hole on a laterally outward (top) ("island") surface of the gripping handle.

Each pair can receive the opposite ends of the corresponding D-ring 480, 490 at the respective ends of the strap 440. The user can thereby attach the strap 440 to the clipper 100 in a crossing/diagonal manner from forward left to rearward right or rearward left to forward right. This has the advantage of accommodating alternatively users' right hand R and left hand L, as can be understood from FIGS. 9 and 10. The user can also adjust the exact forward and rearward locations as desired by repositioning the D-rings 480, 490 to a different pair of holes in the respective series of openings 450, 460 (rearward and forward, and/or left and right). The strap 440 can be tightened or loosened by adjusting the clip 510 in a known manner.

The engagement/cutting surface 190 of the second head portion 170 forms a blade. And the engagement surface 160 of the first head portion 150 can be formed by an interior surface of a "finger" of the outwardly-disposed slot 104 to receive therein a stem S such as can be understood from FIG. 1. (The present disclosure also includes a non-slotted clipper, known as a double-cut type of clipper.) Thus, with the user grasping the gripping handles 400, 410 with the strap 440 in the desired place and length, positioning the stem S in the slot 104 with the forward surface of the first head portion 150 on the fruit F, and squeezing the handle portions 140, 170, with pressure P, causing the second arm to pivot relative to the first arm 110 on the roller bearing 230, the engagement/cutting surface 190 and the slot 104 are pivoted together cutting the stem S between them at the precise distance from and angle relative to the fruit F, leaving only the button of the fruit (lemon).

Figure 8:
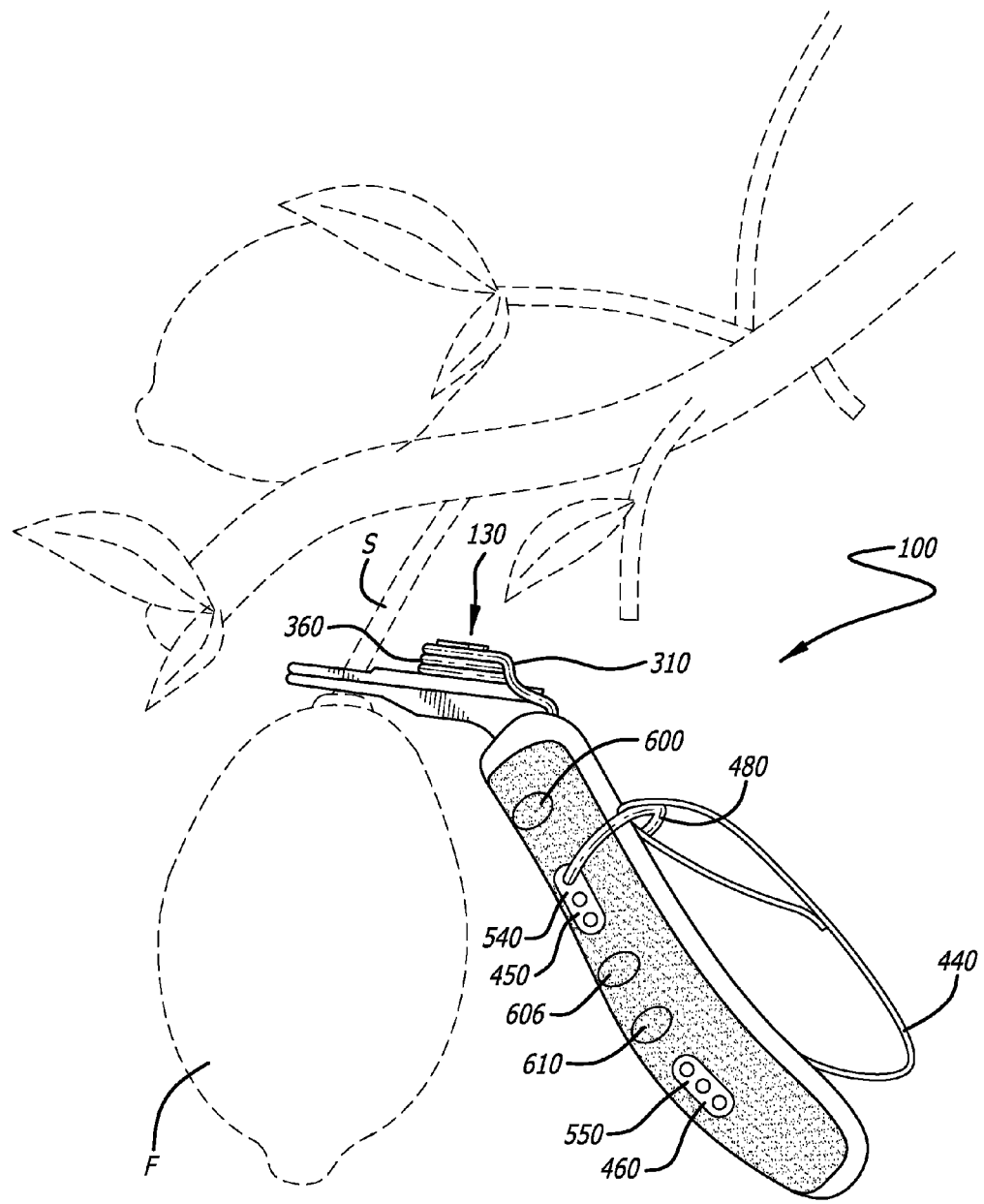
FIG. 8 is a side elevational view of the clipper in a clipping position.
Figure 11:
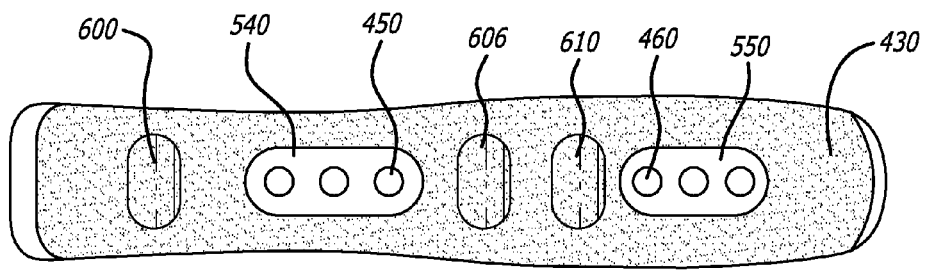
FIG. 11 is an enlarged top plan view of one of the gripping handles of the clipper of FIG. 1 and illustrated in isolation.
Figure 12:
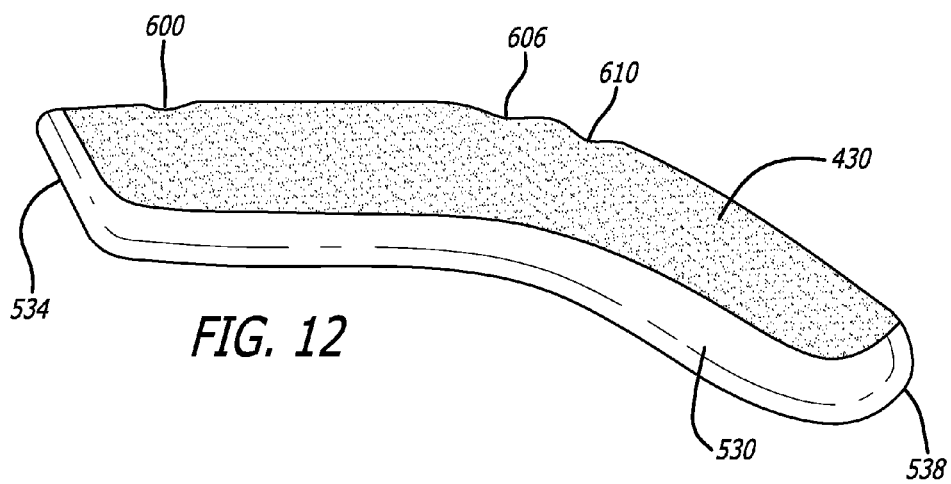
FIG. 12 is a side elevational view thereof.
Figure 13:
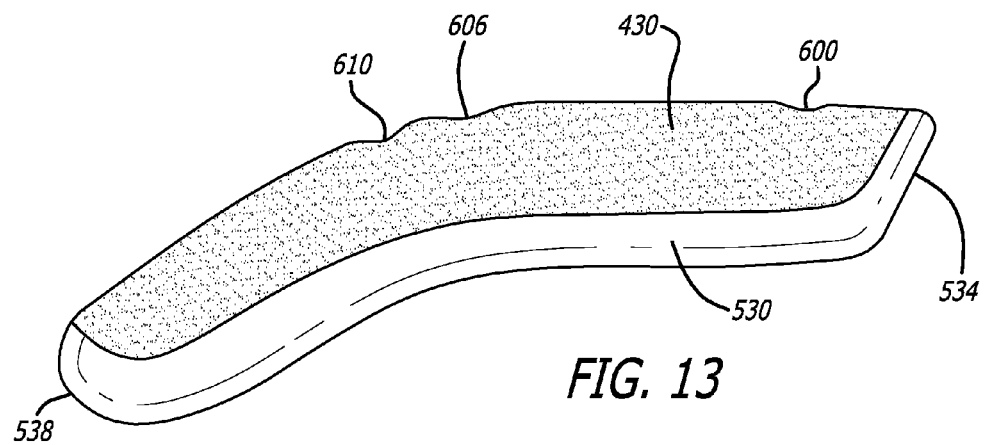
FIG. 13 is an opposite side elevational view thereof.
Figure 14:
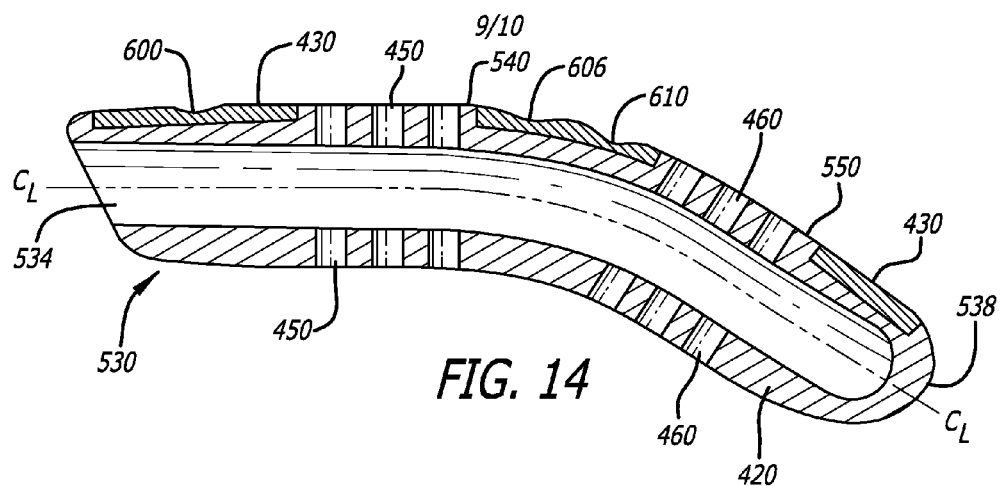
FIG. 14 is a cross-sectional view thereof.
Figure 15:
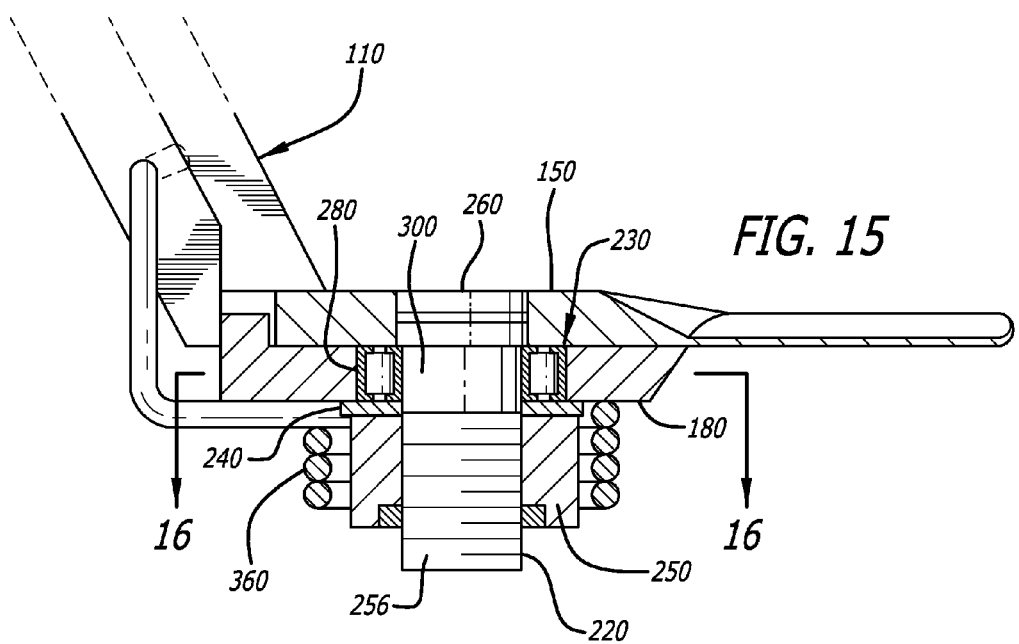
FIG. 15 is a partial cross-sectional view of the pivot assembly of the clipper and taken on line 15-15 of FIG. 6.

FIGS. 1, 6, 7 and 15 illustrate the extra flat, concave blade configuration of the forward surface of the first head portion 150, which configuration adapts to the shape of the fruit F thereby allowing the worker to sever the stem S close enough to the button that a second cut is not necessary. At the same time the cut avoids the shearing of the stem S on an angular plane that would result in sharp edges. The angle from the handle to the tip of the blade allows the fruit F to be severed from the stem S from uniquely any angle the clipper 100 comes into contact with the stem, as can be understood from FIGS. 1 and 8, for example. Thereby, the user with the clipper 100 held in one hand H can position the stem S in the slot 104, grasp the fruit (lemon) F with his other hand, clip the stem at the precise location with the precise cut and without damaging the fruit, and toss the fruit into the awaiting container (not shown), such as a Cordura sack.

Details of the configuration and construction of the gripping handles 400, 410 are illustrated in many of the drawing figures including FIGS. 11-14. Referring thereto, each of the gripping handles 400, 410 can include a uniquely configured sleeve 530 (formed by substrate 420) and a coating or overmold 430 on a portion of the sleeve. The sleeve 530 can be hollow with an open end 534 and a closed end 538. The gripping handle 400 (or 410) can be curved in a finger-like shape as can seen from the side elevational views of FIGS. 12 and 13.

The sleeve 530 can include a front "island" 540 and a rear "island" 550, which is spaced rearwardly from the front island. Both of the islands can have one or more through-holes 450, 460, with the through-holes extending through the sleeve hollow interior and through the opposite (bottom) sleeve wall, as can be understood from FIG. 14. The holes define "pairs" of holes as discussed earlier with respect to reference numerals 450, 460. With the gripping handles 400, 410, press fit onto their respective handle portions 140, 170, the holes in the gripping handles align with the corresponding holes 560, 570, 580, 590 in the handle portions (FIGS. 3 and 17). For example, the six pairs of holes in the gripping handle, as can be seen in FIG. 3, align with the corresponding six pairs of holes in the handle portion, such as shown in FIGS. 2, 3 and 17. Thereby the D-rings 480, 490 at the ends of the strap 440 can be inserted into the desired pairs of holes in the gripping handles 400, 410, extending into the aligned holes in the respective handle portions 140, 170 for secure positioning. The D-rings 480, 490 can be manipulated by the user for positioning in alternative pairs of holes/openings to either adjust between right and left hand R, L fits (FIGS. 9 and 10) or to adjust at a finer level one of those fits by selecting another one of the pairs of holes in the series of three holes in one or both of the islands 540, 550. Instead of D-rings, other shapes, configurations and/or forms of connectors can be used as would be apparent to those skilled in the art from this disclosure.

Lateral indents 600, 606, 610 can be formed on/by the coating 430 (or by the underlying sleeve), such as shown in FIGS. 6, 7, and 11-14 to provide for a better grip by the user but without getting caught on the user's gloves. Other configurations such as bumps and other positionings of the grip-improvement members are within the scope of this disclosure.

The rubber gripping handles 400, 410 can be designed with the two sets of three holes on each side, as shown in the drawings. This allows the user to adjust the strap 440 at a comfortable level whether the user is right or left-handed. Referring to FIG. 9, a user's right hand R can adjust the left side of the strap 440 on the upper sets of three, while the right side of the strap would be adjusted on the lower three holes. The opposite would apply for a user's left hand L (FIG. 10).

It is also within the scope of the disclosure to provide alternative arrangements of the holes in the handles. For example, the two islands 530, 540 can be formed as a single continuous "island"; different numbers of holes (for example, one, two or more than three holes) can be provided in one or both islands, or more than two islands can be provided. The handles 400, 410 can be configured without islands. Instead of separately formed gripping handles, the gripping handles can be coated/formed directly on the handle portions, and the coatings can have gripping and/or anti-bacterial solution receiving properties. The D-rings 480, 490 can have alternative constructions and configurations as would be apparent to those skilled in the art. Instead of handle holes/openings other removable/adjustable attachment means can be used such as snap-on, hook-and-loop, or resilient arrangements.

As examples only the material of the sleeve, that is, the substrate 420 of the sleeve 530 can use TPE-80-90 A as its production material or POLYPROPYLENE 90A-30D SHORE HARNESS OF 80A-90A. A specific example can be F-80 A/B 80 Shore A Polyurethane Elastomer, available from BJB Enterprises, Inc. The over-molded material (or coating) 430 can use TPE-40-60A Thermal plastic elastomer as its production material. And a specific example can be F-60 A/B 60 Shore A Polyurethane Elastomer, also available from BJB Enterprises, Inc. More particularly, the coating 430 may be overmolded on the sleeve 530; that is, after the sleeve has been formed in a first mold and dried, it can be positioned in a second mold where the coating is overmolded onto it.

A further alternative is to configure the gripping handles so that they can be removed and replaced. As an example, resilient snap-on attachments can be used to make for easier attachment and removal. They can be replaced, for example, with individualized or customized gripping handles. More particularly, the gripping handles can have fits better suited to different users or uses. Alternatively, they can have distinctive colorings, insignia, trademarks or the like, such as for different employers, different countries (e.g., green/white/red for Mexico, red/white/blue for the U.S., green/white/red for Italy and red/yellow for Spain) or corresponding to specific sports teams (e.g., soccer).

The rubber gripping handles 400, 410 can be assembled on to the metal handle portions 140, 170 prior to public sale by pressuring them onto the metal handle. They can be secured into place with the D-rings 480, 490 that extend through the metal and the rubber. The gripping handles 400, 410 can be replaced if necessary by unlocking the D-rings 480, 490. These handles can be constructed for easy cleaning and disinfecting, such as set forth by the FDA in the Guide to Minimize Microbial Food Safety Hazards for Fresh Fruits and Vegetables. The gripping handles 400, 410 can be washed (such as with soap and water) and disinfected daily without diminishing their adherent properties. An example of a disinfectant that can be used is a mixture of one part CLOROX to one gallon of water.

Although the present inventions have been described in terms of preferred and alternative embodiments above, numerous modifications and/or additions to the above-described embodiments would be readily apparent to one skilled in the art. The embodiments can be defined as methods of use or assembly carried out by anyone, any subset of or all of the components and/or users; as systems of one or more components in a certain structural and/or functional relationship; and/or as subassemblies or sub-methods. The inventions can include each of the individual components separately. However, it is intended that the scope of the present inventions extend to all such modifications and/or additions and that the scopes of the present inventions are limited solely by the claims set forth herein.

Individual elements or features of a particular aspect of the present teachings are generally not limited to that particular aspect, but, where applicable, are interchangeable and can be used in other aspects, even if not specifically shown or described. The same may also be varied in many ways. Such variations are not to be regarded as a departure from the present teachings, and all such modifications are intended to be included within the scope of the present teachings. The present disclosure further includes subassemblies, as well as methods of using and/or making the clipper and/or components thereof.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including" and "having" are inclusive and therefore specify the presence of stated features, integers, steps, operations, elements and/or components, but do not preclude the presence or addition of one or more other features, integers, steps, operations, elements, components and/or groups thereof. The method steps, processes and operations described herein are not to be construed as necessarily requiring their performance in the particular order discussed or illustrated, unless specifically identified as an order of performance. It is also to be understood that additional or alternative steps may be employed.

Although the terms first, second, third and so forth may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second" and other numerical terms when used herein do not imply a sequence or order unless clearly indicated by the context. Thus, a first element, component, region, layer or section discussed below can be termed a second element, component, region, layer or section without departing from the aspects of the present teachings.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (such as "between" versus "directly between," and "adjacent" versus "directly adjacent"). As used herein, the term "and/or" includes any and all combinations of one or more of the associated listed items.

Spatially relative terms, such as "inner," "outer," "beneath," "below," "lower," "upper," "above," "forward," and "rearward," may be used herein for ease of description to describe one element's or feature's relationship to another, but the disclosure is intended to encompass different orientations of the device (e.g., clipper or gripping handle) in use or operation in addition to the orientation depicted in the figures. For example, if the device (clipper or gripping handle) in the figures is turned over, elements described as "below" or "beneath" other elements or features would then be oriented "above" the other elements or features. Thus, the example term "below" can encompass both an orientation of above and below. The device may be otherwise oriented (rotated ninety degrees or at other orientations) and the spatially relative descriptors used herein interpreted accordingly.

What is claimed is:

1. A clipper comprising:
    a first operating arm having a first handle portion and a first head portion; the first head portion including a first engagement surface;
    a second operating arm having a second handle portion and a second head portion; the second head portion including a second engagement surface;
    at least one of the engagement surfaces being a cutting surface;
    the first and second head portions being pivotally connected together to allow at least one of the first and second engagement surfaces to be moved from an open position towards the other of the engagement surfaces and thereby cut an object in between the engagement surfaces;
    the first head portion including a first through-hole and the second head portion including a second through-hole generally aligned with the first through-hole;
    a pivot assembly about which the first and second head portions pivot, and including a roller bearing and a screw;
    the screw having a head, a threaded portion and a cylindrical portion therebetween; and
    the roller bearing having an outer race and an inner race, the outer race being fit in the second through-hole and the inner race being fit on the cylindrical portion;
    wherein the roller bearing is a sealed roller bearing and has one surface flush with a top surface of the second head portion and an opposite surface flush with a bottom surface of the second head portion.

2. The clipper of claim 1 wherein the pivot assembly includes a nut threaded onto the threaded portion and a washer sandwiched between the nut and a rear face of the second head portion.

3. The clipper of claim 2 further comprising a torsion spring operatively connected at one end to the first operating arm and at an opposite end to the second operating arm and having a coiled portion encircling the nut.

4. The clipper of claim 1 wherein the first head portion includes on an outward surface thereof a non-circular recess through which the first through-hole passes, and wherein the head of the screw is a non-circular head positioned in the non-circular recess such that one or more sides of the recess prevent the screw from rotating when a nut of the pivot assembly is tightened.

5. The clipper of claim 1 wherein the first head portion has a pair of spaced fingers defining a slot for receiving the object between them; one of the fingers includes the first engagement surface and is disposed opposite to the second engagement surface; and the second head portion includes a finger having the second engagement surface; and the second engagement surface is a cutting surface.

6. The clipper of claim 1 wherein:
one of the head portions has an abutment member between upper portions of the first and second handle portions;
the other of the head portions has a first abutment surface that the abutment member can abut to thereby define a fully open position of the first and second operating arms and positioned between the upper portions of the first and second handle portions; and
the other of the head portions has a second abutment surface that the abutment member can abut to thereby define a fully closed position of the first and second operating arms and positioned between the upper portions of the first and second handle portions.

7. The clipper of claim 1 wherein the pivot assembly includes a torsion spring having a helical portion, a first end of the torsion spring is removably positioned in a first opening in the first handle portion, and the second end of the torsion spring is removably positioned in a second opening in the second handle portion;
wherein the pivot assembly includes a nut threaded onto the threaded portion; and
wherein the helical portion encircles the nut such that the helical portion is removable away from the second head portion without unthreading the nut.

8. The clipper of claim 1 further comprising: one of the head portions having an abutment member between upper portions of the first and second handle portions, and the other of the head portions having an abutment surface that the abutment member can abut to thereby define a fully open position of the first and second operating arms and positioned between the upper portions of the first and second handle portions; wherein the abutment surface is defined by an end of a bottom edge slot between upper ends of the first and second handle portions, and the abutment member includes a bottom-edge abutment pin between the upper ends of the first and second handle portions and which travels in the slot as the handle portions are moved between open and closed positions.

9. A clipper comprising:
a first operating arm having a first handle portion and a first head portion; the first cutting head portion including a first engagement surface;
a second operating arm having a second handle portion and a second head portion; the second head portion including a second engagement surface;
at least one of the engagement surfaces being a cutting surface;
the first and second head portions being pivotally connected together to allow at least one of the first and second engagement surfaces to be moved from an open position towards the other of the engagement surfaces about a pivot axis and to thereby cut an object in between the engagement surfaces;
a torsion spring having a first end operatively coupled to the first handle portion, a second end operatively coupled to the second handle portion, and a helical portion between the first and second ends, encircling the pivot axis of the head portions; the torsion spring being configured to bias the engagement surfaces towards the open position;
a pivot assembly about which the first and second head portions pivot, and including a roller bearing and a screw; the screw having a head, a threaded portion and a cylindrical portion therebetween; and the roller bearing having an outer race and an inner race, the outer race being fit in a through-hole of the second head portion, and the inner race being fit on the cylindrical portion; and
wherein the first end of the torsion spring is removably positioned in a first opening in the first handle portion, and the second end of the torsion spring is removably positioned in a second opening in the second handle portion;
wherein the first opening is in a top lateral interior surface of the first handle portion and the second opening is in a top lateral interior surface of the second handle portion;
wherein the pivot assembly includes a nut threaded onto the threaded portion; and
wherein the helical portion encircles the nut such that the helical portion is removable away from the second head portion without unthreading the nut.

10. The clipper of claim 9 wherein:
one of the head portions has an abutment member between upper portions of the first and second handle portions;
the other of the head portions has a first abutment surface that the abutment member can abut to thereby define a fully open position of the first and second operating arms and positioned between the upper portions of the first and second handle portions; and
the other of the head portions has a second abutment surface that the abutment member can abut to thereby define a fully closed position of the first and second operating arms and positioned between the upper portions of the first and second handle portions.

11. The clipper of claim 9 wherein the first head portion has a pair of spaced fingers defining a slot for receiving the object between them; one of the fingers includes the first engagement surface which is disposed opposite to the second engagement surface; and the second head portion includes a finger having the second engagement surface, and the second engagement surface is a cutting surface.

12. The clipper of claim 9 wherein the first end is a first angled end portion positioned in the first opening; the second end is a second angled end portion positioned in the second opening; and the roller bearing is a sealed roller bearing and has one surface flush with a top surface of the second head portion and an opposite surface flush with a bottom surface of the second head portion.

13. The clipper of claim 9 further comprising: one of the head portions having an abutment member between upper portions of the first and second handle portions, and the other of the head portions having an abutment surface that the abutment member can abut to thereby define a fully open position of the first and second operating arms and positioned between the upper portions of the first and second handle portions; wherein the abutment surface is defined by an end of a bottom edge slot between upper ends of the first and second handle portions, and the abutment member includes a bottom-edge abutment pin between the upper ends of the first and second handle portions and which travels in the slot as the handle portions are moved between open and closed positions.

14. The clipper of claim 9 further comprising a handle on one of the handle portions and including:
- an elongate sleeve having an open end, an opposite closed end and a hollow interior from the open end to the closed end;
- the sleeve including an outwardly-extending first island and an outwardly-extending second island spaced a distance longitudinally from the first island;
- the sleeve including a first through-hole extending through the first island, the hollow interior and an opposite sleeve wall and engaging a bottom surface of the sleeve;
- the sleeve including a second through-hole extending through the second island, the hollow interior and the opposite sleeve wall and engaging the bottom surface; and
- a coating on the sleeve and at least substantially encircling the first and second islands.

15. The clipper of claim 14 wherein the coating is on a top but not a bottom surface of the sleeve, is overmolded on the sleeve and is substantially flush with top surfaces of the first and second islands.

16. A clipper comprising:
- a first operating arm having a first handle portion and a first head portion; the first head portion including a first engagement surface;
- a second operating arm having a second handle portion and a second head portion; the second head portion including a second engagement surface;
- at least one of the engagement surfaces being a cutting surface;
- the first and second head portions being pivotally connected together to allow at least one of the first and second engagement surfaces to be moved from an open position towards the other of the engagement surfaces and thereby cut an object in between the engagement surfaces;
- the first head portion including a first through-hole and the second head portion including a second through-hole generally aligned with the first through-hole;
- a pivot assembly about which the first and second head portions pivot, and including a roller bearing and a screw;
- the screw having a head, a threaded portion and a cylindrical portion therebetween; and
- the roller bearing having an outer race and an inner race, the outer race being fit in the second through-hole and the inner race being fit on the cylindrical portion;
- wherein the pivot assembly includes a nut; and
- wherein the first head portion includes on an outward surface thereof a non-circular recess through which the first through-hole passes, and wherein the head of the screw is a non-circular head positioned in the non-circular recess such that one or more sides of the recess prevent the screw from rotating when the nut is tightened.

17. The clipper of claim 16 wherein:
- one of the head portions has an abutment member between upper portions of the first and second handle portions;
- the other of the head portions has a first abutment surface that the abutment member can abut to thereby define a fully open position of the first and second operating arms and positioned between the upper portions of the first and second handle portions; and
- the other of the head portions has a second abutment surface that the abutment member can abut to thereby define a fully closed position of the first and second operating arms and positioned between the upper portions of the first and second handle portions.

18. The clipper of claim 16 wherein the first head portion has a pair of spaced fingers defining a slot for receiving the object between them; one of the fingers includes the first engagement surface which is disposed opposite to the second engagement surface; and the second head portion includes a finger having the second engagement surface, and the second engagement surface is a cutting surface.

19. The clipper of claim 16 wherein the pivot assembly includes a torsion spring, a first angled end of the torsion spring is removably positioned in a first opening in the first handle portion, and a second angled end of the torsion spring is removably positioned in a second opening in the second handle portion;
- wherein the nut is threaded onto the threaded portion; and
- wherein a helical portion of the torsion spring encircles the nut such that the helical portion is removable away from the second head portion without unthreading the nut.

20. The clipper of claim 16 wherein the pivot assembly includes a torsion spring and the torsion spring includes a helical portion that encircles a pivot axis of the head portions and the torsion spring is configured to bias the engagement surfaces towards the open position.

21. The clipper of claim 16 further comprising a handle on one of the handle portions and including:
- an elongate sleeve having an open end, an opposite closed end and a hollow interior from the open end to the closed end;
- the sleeve including an outwardly-extending first island and an outwardly-extending second island spaced a distance longitudinally from the first island;
- the sleeve including a first through-hole extending through the first island, the hollow interior and an opposite sleeve wall and engaging a bottom surface of the sleeve;
- the sleeve including a second through-hole extending through the second island, the hollow interior and the opposite sleeve wall and engaging the bottom surface; and
- a coating on the sleeve and at least substantially encircling the first and second islands.

22. The clipper of claim 21 wherein the coating is on a top but not a bottom surface of the sleeve, is overmolded on the sleeve and is substantially flush with top surfaces of the first and second islands.

23. A clipper comprising:
- a first operating arm having a first handle portion and a first head portion; the first head portion including a first engagement surface;
- a second operating arm having a second handle portion and a second head portion; the second head portion including a second engagement surface;
- at least one of the engagement surfaces being a cutting surface;
- the first and second head portions being pivotally connected together to allow at least one of the first and second engagement surfaces to be moved from an open position towards the other of the engagement surfaces and thereby cut an object in between the engagement surfaces;

a first gripping handle on the first handle portion and having at least first and second pairs of openings;

a second gripping handle on the second handle portion and having at least first and second pairs of openings;

a strap;

a first ring at one end of the strap, and opposite ends of which are positionable in alternatively the first and second pairs of openings in the first gripping handle;

a second ring at an opposite end of the strap, and opposite ends of which are positionable in alternatively the first and second pairs of openings in the second gripping handle; and a pivot assembly about which the first and second head portions pivot, and including a roller bearing and a screw; the screw having a head, a threaded portion and a cylindrical portion therebetween; and the roller bearing having an outer race and an inner race, the outer race being fit in a through-hole of the second head portion, and the inner race being fit on the cylindrical portion.

24. The clipper of claim 23 wherein:

one of the head portions has an abutment member between upper portions of the first and second handle portions;

the other of the head portions has a first abutment surface that the abutment member can abut to thereby define a fully open position of the first and second operating arms and positioned between the upper portions of the first and second handle portions; and the other of the head portions has a second abutment surface that the abutment member can abut to thereby define a fully closed position of the first and second operating arms and positioned between the upper portions of the first and second handle portions.

25. The clipper of claim 23 wherein the roller bearing is a sealed roller bearing and has one surface flush with a top surface of the second head portion and an opposite surface flush with a bottom surface of the second head portion.

26. The clipper of claim 23 wherein the first head portion has a pair of spaced fingers defining a slot for receiving the object between them; one of the fingers includes the first engagement surface which is disposed opposite to the second engagement surface; and the second head portion includes a finger having the second engagement surface, and the second engagement surface is a cutting surface.

27. The clipper of claim 23 wherein the pivot assembly includes a torsion spring, a first end of the torsion spring is removably positioned in a first opening in the first handle portion, and a second end of the torsion spring is removably positioned in a second opening in the second handle portion;

wherein the pivot assembly includes a nut threaded onto the threaded portion; and wherein a helical portion of the torsion spring encircles the nut such that the helical portion is removable away from the second head portion without unthreading the nut.

28. The clipper of claim 23 wherein the pivot assembly includes a torsion spring, and the torsion spring includes a helical portion that encircles a pivot axis of the head portions and the torsion spring is configured to bias the engagement surfaces towards the open position.

29. The clipper of claim 23 wherein the first gripping handle includes:

an elongate sleeve having a central axis, an open end, an opposite closed end and a hollow interior from the open end to the closed end;

the sleeve including an outwardly-extending first island and an outwardly-extending second island spaced a distance longitudinally from the first island;

the sleeve including a first through-hole extending through the first island, the hollow interior and an opposite sleeve wall and engaging a bottom surface of the sleeve;

the sleeve including a second through-hole extending through the second island, the hollow interior and an opposite sleeve wall and engaging a bottom surface of the sleeve; and a coating on the sleeve and at least substantially encircling the first and second islands;

wherein the first handle portion includes an arm first through-hole and an arm second through-hole, the sleeve first through-hole being aligned with the arm first through-hole and the sleeve second through-hole being aligned with the arm second through-hole.

30. The clipper of claim 29 wherein the coating is molded onto the sleeve, does not cover a bottom surface of the sleeve opposite to the islands, and comprises a material that is softer than the material of the sleeve.

* * * * *